W. MARQUETTE.
BAGGAGE CARRIER.
APPLICATION FILED OCT. 25, 1913.

1,095,339.

Patented May 5, 1914.

Inventor
W. MARQUETTE

Witnesses
Oscar V. Payne
V. J. Nowruck.

By Watson E. Coleman
Attorney

UNITED STATES PATENT OFFICE.

WILLIAM MARQUETTE, OF ATLANTIC, IOWA.

BAGGAGE-CARRIER.

1,095,339.

Specification of Letters Patent. Patented May 5, 1914.

Application filed October 25, 1913. Serial No. 797,309.

*To all whom it may concern:*

Be it known that I, WILLIAM MARQUETTE, a citizen of the United States, residing at Atlantic, in the county of Cass and State of Iowa, have invented certain new and useful Improvements in Baggage-Carriers, of which the following is a specification, reference being had to the accompanying drawings.

This invention relates to new and useful improvements in baggage carriers which is especially designed for attachment to the foot board of an automobile or the like vehicle.

The object of the present invention is the provision of a device which can be quickly and easily attached or detached from the foot board of any make of automobile where suit cases, grips and other small articles of baggage may be readily supported in position upon the foot board and the device is to take the place of the usual baggage carrier now in use upon automobiles which is generally provided at the rear of the vehicle.

Another object of the invention is to provide a device of the above character which is adapted for application to the foot board of an automobile and is so arranged that the same may be folded out of the way when not in use and can be quickly arranged in position when it is desired to support small articles of baggage upon the foot board.

A still further object of the invention is the provision of a device of the above character which will possess advantages in points of efficiency and durability, is inexpensive of manufacture and at the same time is simple in construction and operation.

With the above and other objects in view, the invention consists in the novel features of construction and the combination of parts to be hereinafter more fully described, pointed out in the claim and shown in the accompanying drawings, in which—

Figure 1:
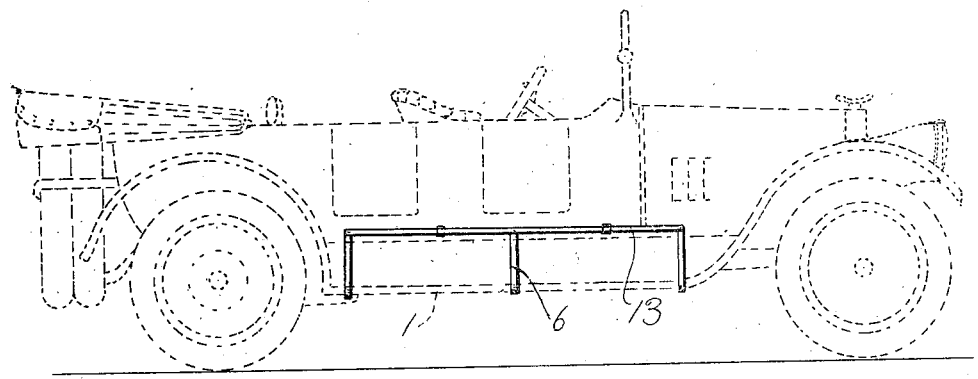
Figure 2:
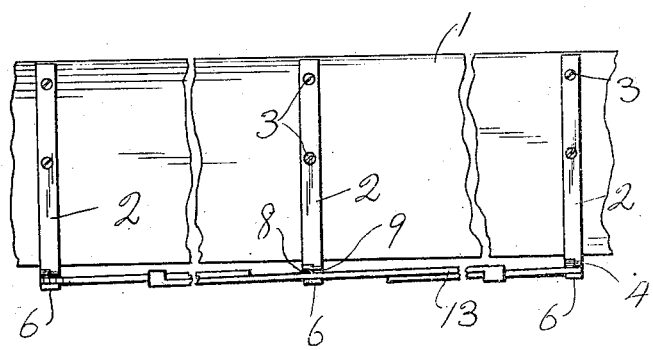
Figure 3:
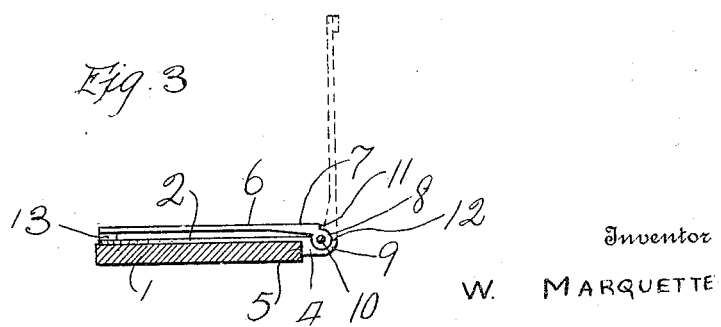

Figure 1 is a side elevation illustrating the application of my invention; Fig. 2 is a top plan view; and Fig. 3 is a transverse sectional view, the same being shown in a closed position and in open position in dotted lines.

Referring more particularly to the drawings, 1 indicates the foot board of a vehicle and to which my improved device is adapted to be applied. The device in itself first consists of parallel arranged spaced longitudinal bars 2 which are arranged upon the upper face of the foot board and bolted or otherwise secured thereto, as shown at 3. The outer ends of the bars 2 are provided with enlarged portions 4, each having a shoulder 5 which is adapted to abut against the outer longitudinal edge of the foot board to limit the longitudinal movement of the bars 2. The device further consists in a second set of spaced parallel bars, as indicated by the numeral 6, one of the ends of which are provided with enlarged portions 7 and further provided with circular portions 8 which are arranged in alinement with the circular portions 9 of the bars 2 and pivotally secured thereto by means of the pivoted bolts 10. The enlarged portions 7 of the bars 6 are provided with suitable shoulders 11 adapted to abut the shoulders 12 formed upon the enlarged portions 4 when the bars 6 are in an upright position to limit outward swinging movement of the bars other than to a vertical position.

It will be noted from the accompanying drawings that the bars 6 are pivotally connected to the horizontal bars 2 at the outer ends thereof and the outer ends of the bars 6 are suitably connected and retained against movement by means of a longitudinal adjustable bar 13, thus forming a suitable supporting rack against which the articles of baggage are adapted to rest. It will be noted that when the bars 6 are in an upright position they are spaced from the body of the machine so that suit cases, grips or other similar articles of baggage may be placed upon the running board and disposed between the body of the machine and the rack formed by the bars 6 and 13.

It will be readily apparent from the accompanying drawings taken in connection with the description given herewith that I have provided a simple and durable device which may be quickly and readily attached or detached from the foot board of a vehicle and when not in use may be folded downwardly upon the foot board so as to be entirely out of the way and not interfere with the entrance of the vehicle. It will also be apparent that the device may be quickly and readily placed in position for use when it is desired to use the same for retaining articles of baggage upon the foot board when traveling. The device in itself is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

The combination with the foot board of a vehicle, of spaced parallel bars removably mounted upon the same, enlarged portions having shoulders at each end thereof, one of said shoulders abutting the outer longitudinal edge of the foot board, a second set of bars arranged in spaced parallel relation and having their inner ends pivotally connected to the outer ends of the first bars, said second bars having shoulders upon their inner ends adapted to engage the second set of shoulders on the first bars and a longitudinal bar rigidly connecting the outer ends of the second set of bars.

In testimony whereof I hereunto affix my signature in the presence of two witnesses.

WILLIAM MARQUETTE.

Witnesses:
DELMAR O. HERBERT,
E. T. SHANNON.